United States Patent
Addink

[19]

[11] Patent Number: 6,102,061
[45] Date of Patent: Aug. 15, 2000

[54] IRRIGATION CONTROLLER

[76] Inventor: John W. Addink, 2900 Adams St., Suite C-230, Riverside, Calif. 92504

[21] Appl. No.: 09/082,603

[22] Filed: May 20, 1998

[51] Int. Cl.$^7$ .................................................. A01G 25/16
[52] U.S. Cl. ............................... 137/1; 137/78.3; 239/64; 239/69; 239/70
[58] Field of Search .................. 137/78.3, 1; 239/63, 239/64, 69, 71, 1

[56] References Cited

U.S. PATENT DOCUMENTS

| | | | |
|---|---|---|---|
| 4,396,149 | 8/1983 | Hirsch .................................... | 137/78.3 |
| 4,545,396 | 10/1985 | Miller et al. ............................ | 137/78.3 |
| 4,548,225 | 10/1985 | Busalacchi ............................. | 137/78.3 |
| 4,646,224 | 2/1987 | Ransburg et al. ....................... | 417/12 |
| 5,208,855 | 5/1993 | Marian ................................... | 239/69 |
| 5,337,957 | 8/1994 | Olson ..................................... | 137/78.3 |
| 5,444,611 | 8/1995 | Woytowitz et al. .................. | 137/624.2 |

*Primary Examiner*—A. Michael Chambers
*Attorney, Agent, or Firm*—Fish & Associates, LLP; Robert D. Fish

[57] ABSTRACT

An irrigation controller modifies sophisticated irrigation protocols using an extremely simple user control. In one aspect of a particularly preferred class of embodiments, the user control includes a simple "more/less" (increase/decrease) adjustment. In another aspect of preferred embodiments, the controller automatically determines appropriate irrigation amounts, start times, durations, and frequencies. Such automatic determination may advantageously be based in part on the more/less adjustment, and in part on an external signal, such as that transmitted by a radio transmitter.

18 Claims, 3 Drawing Sheets

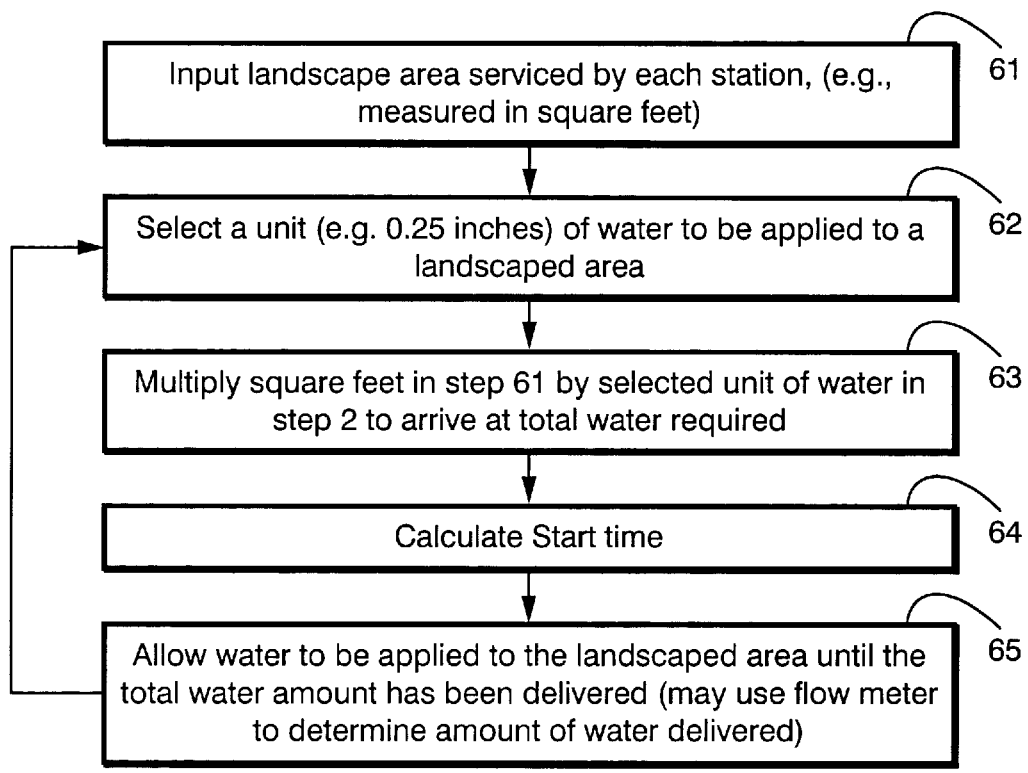

FIG. 4

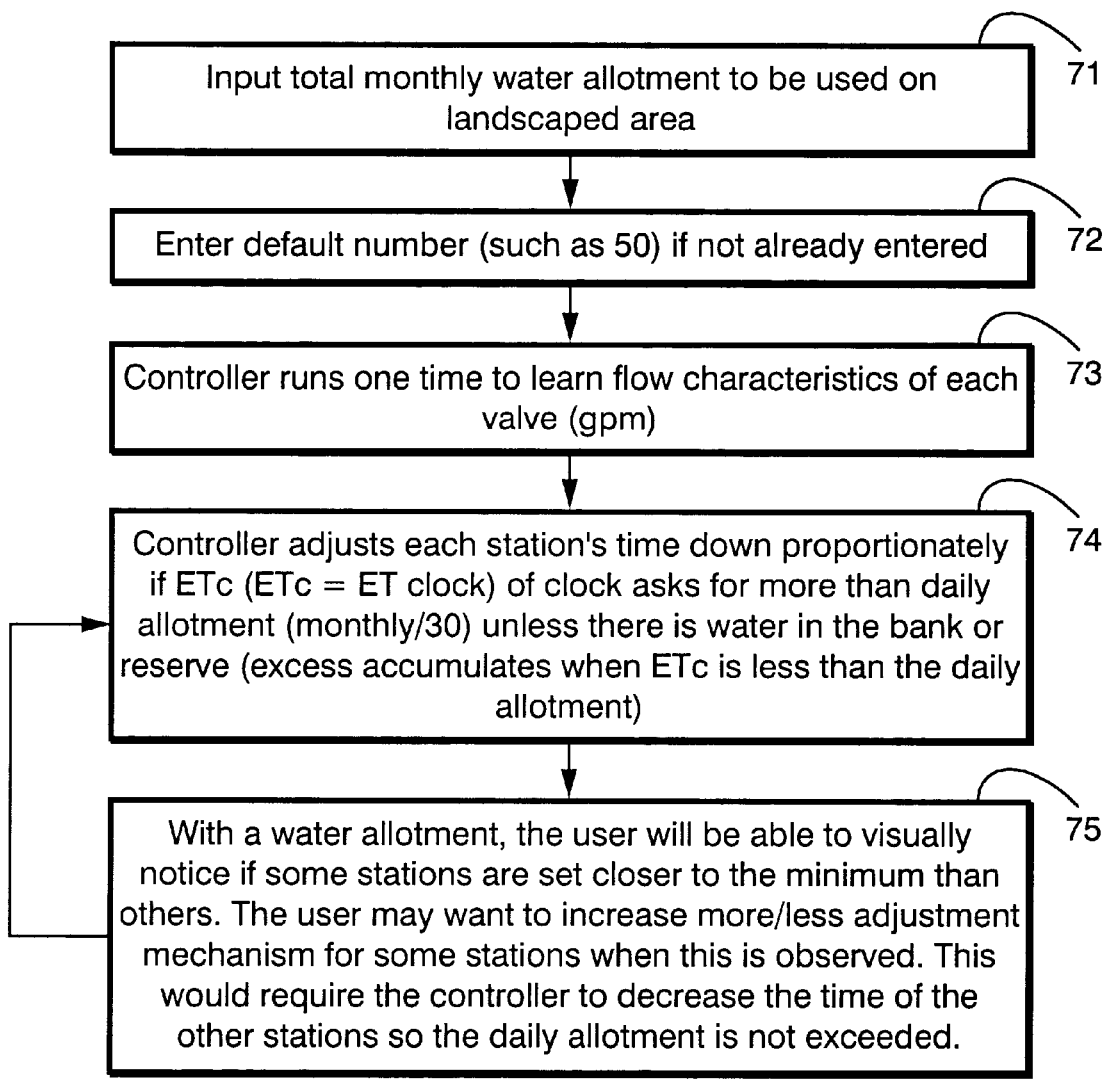

71 — Input total monthly water allotment to be used on landscaped area

72 — Enter default number (such as 50) if not already entered

73 — Controller runs one time to learn flow characteristics of each valve (gpm)

74 — Controller adjusts each station's time down proportionately if ETc (ETc = ET clock) of clock asks for more than daily allotment (monthly/30) unless there is water in the bank or reserve (excess accumulates when ETc is less than the daily allotment)

75 — With a water allotment, the user will be able to visually notice if some stations are set closer to the minimum than others. The user may want to increase more/less adjustment mechanism for some stations when this is observed. This would require the controller to decrease the time of the other stations so the daily allotment is not exceeded.

IRRIGATION CONTROLLER

FIELD OF THE INVENTION

The field of the invention is irrigation controllers

BACKGROUND OF THE INVENTION

Considerable resources have been invested over the years to improve irrigation controllers, especially with respect to increasing sophistication of the watering schedules. Modem controllers, for example, may manipulate half a dozen or more valves, may have multiple on/off periods during the day, may have different watering schedules from day to day during the week.

One undesirable side effect of the trend towards increasingly sophisticated controllers is that the inputs needed to drive such controllers are also becoming more complex. Typical modern controllers require a user to separately specify start times and durations for irrigation intervals for each zone, and possibly for each day of the week. Modem controllers may also take into account inputs from external sensors, such as temperature, wind, precipitation and soil moisture sensors. Still further, systems are also known which receive input from a local or distal signal source, such as a radio transmitter. Exemplary disclosures are U.S. Pat. No. 4,962,522, issued October 1990, and U.S. Pat. No. 5,208,855, issued May 1993, both to Marian, and each of which is incorporated by reference herein in its totality. Such systems offer considerable advantages, including the ability to integrate historical rainfall and other data with current estimated evaporative transpiration (evapotranspiration) rates. Systems which receive distal signal inputs can also provide location specific information, such as by ZIP code.

The large quantity of external data makes irrigation controllers relatively complicated to use, and even systems touting automatic adjustment of irrigation flow still require relatively complicated input. Systems discussed in the U.S. Pat. No. 5,208,855, for example, merely update an interval used for preset irrigation control timings, rather than determine an entirely new irrigation schedule. Similarly, systems discussed in U.S. Pat. No. 5,444,611 to Woytowitz et al. (August, 1995) are said to automatically calculate and execute a new schedule, but the new schedule is still based upon programming of a start time. Systems disclosed in U.S. Pat. No. 4,646,224 automatically determine the number of cycles and length of time of each cycle that water is to be applied, but still requires the operator to provide data concerning desired sprinkling days, soil type, the type of sprinkler for each zone, and so forth.

The trend towards increasingly sophisticated controllers is accompanied by a trend towards having ever fewer input controls accessible to the user. Decreasing the number of input controls may reduce the cost and size of a controller unit, but it also adds to the complexity of using the unit. The whole process of adjusting a modern irrigation controller can be compared to programming a VCR. It may be advantageous to have available a large number of different functions, but controlling all of those functions using only half a dozen or so buttons is extremely difficult for many individuals. This problem has been resolved to some extent in VCR controllers by utilizing the TV screen as an interactive display, but that approach is not readily adaptable to common household or other irrigation controllers where a relatively small, inexpensive display screen is employed to reduce costs.

Even if the process of modifying controller parameters were not complex, determining appropriate values for the required input parameters may be exceedingly complex. As an example, modifying a watering duration value to provide more water to a particular irrigation zone might involve all of the following steps: (1) determining the total of all the watering durations currently programmed for the zone over the course of a week; (2) estimating an appropriate change in the amount of water to be applied to the zone; (3) translating that amount into a percentage increase over the presently programmed total; (4) translating such percentages into changes in durations and deciding how such changes in durations should be distributed over the existing schedule; and (5) entering the scheduling changes. Step 4 is particularly difficult for many individuals because there are often no established guidelines for deciding among various options. Thus, a user may have insufficient knowledge to decide between reducing the watering for each day by 10 minutes, or eliminating watering entirely two days per week.

In short, the steadily increasing sophistication of irrigation controller outputs, coupled with the steadily increasing difficulty of operating such controllers, is a significant problem for users. Thus, there is a continuing need to provide sophisticated irrigation control, while providing simple operator input.

SUMMARY OF THE INVENTION

Methods and apparatus are provided herein which allow extremely simple user control over sophisticated irrigation controller outputs. In one aspect of a particularly preferred class of embodiments, the user control is a simple "more/less" (increase/decrease) adjustment mechanism. In another aspect of preferred embodiments, the controller automatically determines all aspects of an irrigation schedule, including appropriate irrigation days, start times and durations. Such automatic scheduling determination may advantageously be based in part on the more/less adjustment, and in part on an external signal, such as that transmitted by a radio transmitter. In yet another aspect of preferred embodiments, the automatic scheduling may take into account a water budget allotment.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 3 is a flow diagram illustrating various steps in the use of a flow meter to set watering times for a more/less adjustment mechanism.

FIG. 4 is an alternative flow diagram illustrating various steps in the use of a flow meter to set watering times based in part on a water budget allotment.

DETAILED DESCRIPTION

Figure 1:
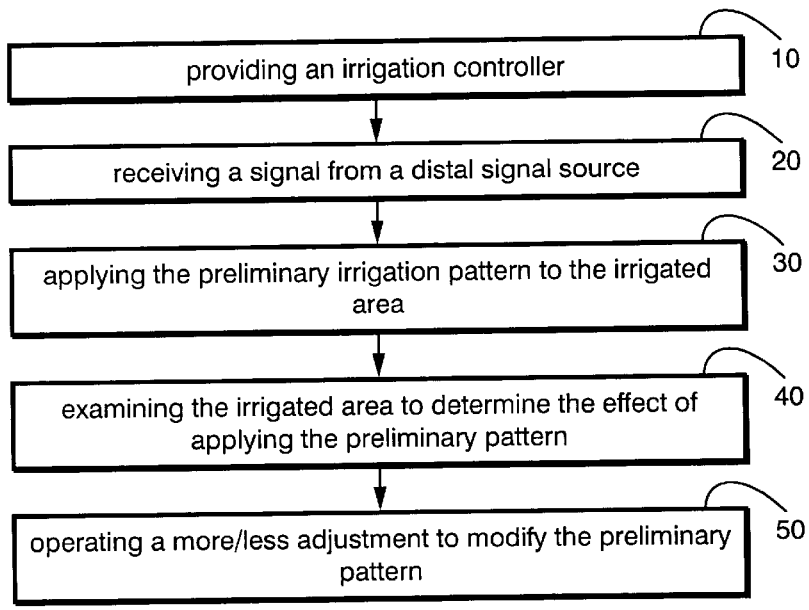
FIG. 1 is a schematic of a method embodying a controller according to the present invention.

Referring first to FIG. 1, a method 1 of controlling irrigation to an irrigated area generally comprises the following steps: providing an irrigation controller which controls at least one irrigation control valve 10; receiving a signal from a distal signal source to establish a preliminary irrigation schedule 20; applying the preliminary irrigation schedule to the irrigated area 30; examining the irrigated area to determine the effect of the preliminary schedule 40; operating a more/less adjustment to modify the preliminary schedule 50; and returning to step 40.

There is a vast range of irrigation controllers suitable for step 10. It is contemplated, for example, that appropriate controllers may operate anywhere from a single zone to as many as a dozen or more zones. In turn, each zone may have one or more valves. Suitable irrigation controllers would generally be located in a garage or other protected area, but may also be distributed, such as throughout a large field. Such controllers would generally be powered from line current, such as household current, but may also be battery powered, or have a battery backup.

The signal used in step 20 to establish a preliminary irrigation schedule may be transmitted and received using any viable means. Radio waves are particularly advantageous, since they travel large distances at relatively low cost. In particularly preferred embodiments, the signal is carried on an existing carrier wave, such as a carrier wave transmitted by an AM or FM radio broadcasting station. In other embodiments, the signal could be carried on a TV or computer cable, or over a telephone line. The signal could be received by any suitable receiver, such as a telephone, radio or a pager-type receiver.

The content of the signal is contemplated to include whatever data may be helpful in establishing an appropriate watering protocol. Thus, for example, the signal may include raw data such as temperature, wind, solar radiation and humidity. Alternatively, or in addition, the signal may include calculated data such as an estimated evapo-transpiration rate. It is considered extremely advantageous, but not necessary, for the signal to include some sort of geographic locator, so that a receiving controller may extract data which is relatively specific to its particular locale. Still further, it is contemplated that the signal may include a plant identifier, so that a receiving controller may adapt a particular watering protocol to a particular plant or type of plant.

In a particularly preferred embodiment, the signal includes a series of geographic locator (GL) and estimated evapo-transpiration rate (ET) pairs, in the format; GL1-ET1, GL2-ET2, GL3-ET3. As mentioned above, the geographic locator may advantageously comprise a five or nine digit ZIP code, but may also reflect some other zoning system which is more agriculturally oriented than ZIP codes. The signal may even intermix different types of geographic locators. The evapo-transpiration rate may be calculated as a function of many different parameters, including temperature, solar radiation, humidity and wind, and preferred formulas for such calculations are set forth in various publications, including Pair, Claude H., Hinz, Walter W. Reid, Crawford, and Frost, Kenneth R., *Sprinkler Irrigation,* (Irrigation Association, 1975).

It is contemplated that the preliminary irrigation schedule of step 30 can be established using only very limited information. Thus, for example, a typical homeowner user may install a controller as described herein by connecting wires from the controller to valve control units, which in turn operate sprinklers in various zones throughout his yard. The homeowner may then use a keypad on the controller to input various codes, such as a geographic locator code, a plant code, a soil type code or even a drainage code. The geographic locator code may well comprise 5 or more digits, while the other codes may advantageously comprise only two or even one digits. The code(s) entered may be taken from a printed manual supplied with the controller, or from some other source such as an internet website, or provided by a telephone operator. In less preferred embodiments, the preliminary irrigation schedule may even be set by default, so that no input codes are required at all.

Of course, where the input codes are zone specific, the user may find it desirable to input different codes for different zones. Thus, for zone 1 a user may enter a code of "01" for established grass, and a code of "5" for moderate drainage, while for zone 2 the user may enter a code of "40" for citrus, and a code of "7" for relatively high drainage, and for zone 3 the user may enter a code of "02" for newly planted grass, and a code of "5" for moderate drainage. Other coding schemes are also contemplated, including the use of letters, and the use of a leading digit or digits to designate the type of code. For example, 01xxxxx could be used for geographic locator codes, 02xx for plant codes, and 03xx for soil type code or drainage code. In this scheme, the "x" would be limited to numbers 1–9.

In establishing a preliminary irrigation schedule, the controller would preferably combine whatever geographic locator, plant type, soil type, slope or other codes are available with data from the external signal. This information would then be used to produce a series of on/off times for each zone. Some zones may even have multiple on/off times, so that a high runoff zone may not be watered for more than 2 or 3 minutes at a time.

In step 30 the preliminary irrigation schedule is applied to the irrigated area. This is generally contemplated to be carried out in the usual manner, with the irrigation controller operating various solenoids which in turn operate valves upstream of watering devices. The watering devices may be sprinkler heads, drip irrigation heads, misting heads, punctured drip irrigation lines, or any other of myriad watering apparatus, or combinations thereof. Signals from the irrigation controller to the solenoids are generally contemplated to be carried along wires in the usual manner, although in some instances the signals can be carried by metallic pipes, by radio wave, or in some other manner.

In step 40 the zone or zones are examined to determine the effect of the preliminary watering schedule. The examination is preferably visual, but may be accomplished by any other suitable means, such as using a soil moisture sensor which may be inserted into one or more sites in the soil of a zone. The examination is preferably carried out after step 3 has been ongoing for a substantial period of time, such as several days or weeks of watering using the preliminary schedule. This provides a good baseline from which reasonable decisions regarding changes in the irrigation schedule can be made. Alternatively, however, inspection can take place after or even during a single watering.

After one or more inspections (step 40), it is contemplated that the user will desire to modify the preliminary schedule for one or more zones. In accordance with preferred embodiments, this can be accomplished by making a simple more/less adjustment for each such zone (step 50). For example, it may be desirable to increase the watering of zone 4 relative to the then-existing watering schedule. To accomplish this the user might press a button to access zone 4, and then press a "more" button once. To increase the watering of zone 4 relative to the then-existing watering schedule yet further, the user might press the "more" button one or more additional times. Obviously reduction in watering could be accomplished by pressing a "less" button, and either increase or decrease in other zones could be accomplished in an analogous manner.

The actual strategy by which an irrigation controller modifies the watering schedule for one or more zones as disclosed herein may vary among different embodiments of the controllers. It may be, for example, that each pressing of the "more" button increases the watering of that zone by 5%, and that each pressing of the "less" button decreases the watering of that zone by 5%. Depending on the previously inputted codes for type of plant, drainage and so forth, that change may be reflected in an across the board change in all watering durations, and/or perhaps in the addition or subtraction of an entire watering day.

It is important to understand that the more/less adjustments contemplated herein may only indirectly control the amount of water provided to a zone. This is because contemplated irrigation controller advantageously determine irrigation schedules based upon one or more algorithms involving many input parameters. This is to be distinguished from a typical irrigation controller in which the user inputted parameters, such as start time, stop time and duration, directly control the irrigation schedule. By way of example, a user employing an indirectly controlled irrigation controller according the inventive subject matter herein may conclude that zone 4 needs more water. By pushing the more button for zone 4, the user tells the system to increase the watering of zone 4, but not how to do so. The system may respond by adding a fraction of a minute to the watering across several days, or by adding an entire minute to the watering on a particular day. In contrast, the same user employing a directly controlled irrigation controller would likely instruct the controller exactly when to increase watering, such as by altering a specific start time, stop time or duration.

It is also important to understand that the term "duration" is used herein in a broad sense to encompass duration both by time and by quantity. Thus, it is contemplated that a controller according to the present inventive subject matter may operate a valve to provide water to a particular zone for a "duration" of three minutes, or for a "duration" sufficient to deposit 1000 gallons.

Figure 2:
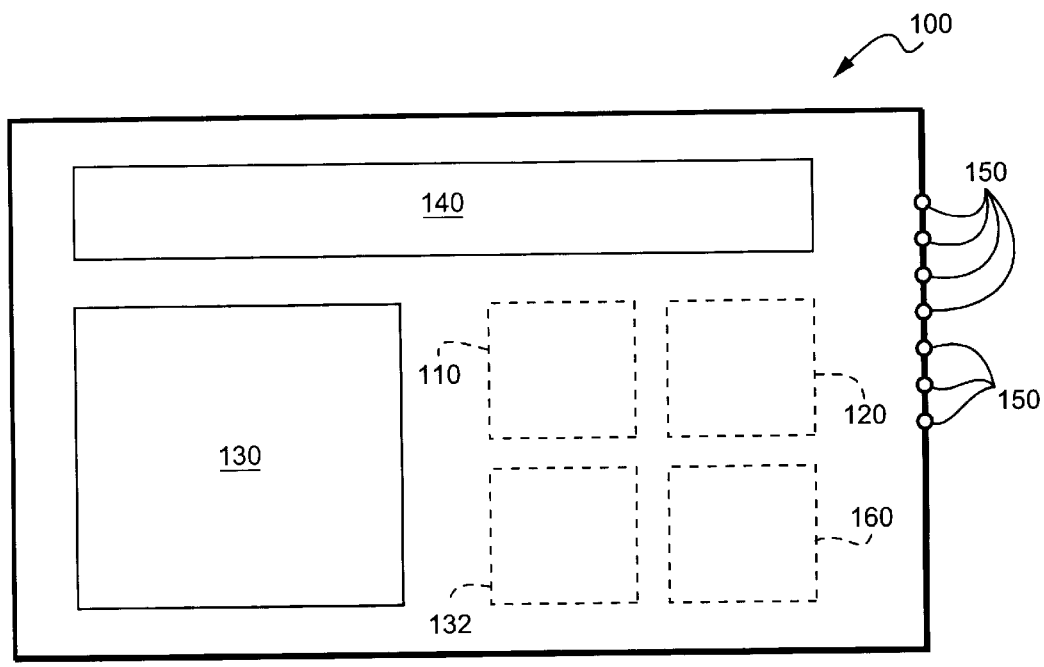
FIG. 2 is a schematic of an irrigation controller according to the present invention.

Turning to FIG. 2, an irrigation controller 100 according to the present invention generally includes a microprocessor based central processing unit 110, an onboard memory 120, a manual input device 130, a signal receiving device 132, a display screen 140, a plurality of electrical connectors 150 for connecting with solenoids (not shown), and a power supply 160. Each of these components by itself is well known in the electronics industry, with the exception of the programming of the microprocessor in accordance with the functionality set forth herein. There are hundreds of suitable chips which can be used for this purpose. At present, experimental versions have been made using the Phillips 87C52 chip, and it is contemplated that such chip would be satisfactory for production models.

It is also contemplated that a flow meter can be employed to provide local input parameters to assist in determining watering schedules. In one possible embodiment, a protocol such as that depicted in FIG. 3 can be used. In step 61 of this particular example, it is contemplated that an installer, gardener, homeowner or other user would input data corresponding to landscape area serviced by each station (i.e., each zone) in a watering system. Of course, the data need not be perfectly accurate, but can be estimated. Moreover, here, as in all other data entry steps, a user may either enter numeric data, or may enter data by selecting from choices provided by the system. In step 62, the user inputs data corresponding to watering unit per landscape area per unit of time. A typical value, for example, may be 0.25 inches per day. In step 63, the system multiplies the landscape area by the watering unit to arrive at designated water amount for each station in the system.

Of course, steps 61, 62 and 63 could be modified to receive many different types of data, in many different formats. These steps could also be merged together by having the user enter a single default number, which would correspond in some manner to the designated water amount. Such a system is exemplified in the discussion of FIG. 4. Steps 61, 62 and 63 could even be eliminated altogether, for example, by having the system use default watering parameters such as x minutes per day, or y gallons per day.

In step 64 the system determines one or more start times for watering, and determines any adjustments which may be made to the designated water amount for each of the stations. The start time(s) may vary from day to day, so that some days may have no start time at all for one or more of the stations, and some days may have multiple start times for one or more of the stations. This flexibility allows the system to compensate for various parameters conditions such as those discussed elsewhere herein, including local weather conditions derived from local sensors, ET data received from a distally generated signal source, internally stored historical ET data, and user input such as from a more/less adjustment.

In step 65, water is applied to each of the stations (preferably in sequence) until data received from a flow or other appropriate metering device indicates that the designated water amount for that station has been applied.

A system such as that charted in FIG. 3 may also be used to control watering based upon a monthly or other water allotment. In effect, the watering allotment is just another piece of data used by the system to determine watering schedules and amounts, and the water allotment may or may not be completely determinative of the total amount of water provided. In the flow diagram of FIG. 4, for example, is an alternative flow diagram illustrating various steps in the use of a flow meter to set watering times based in part on a water budget allotment. Here, it is contemplated that a water district may provide a resident or business with a given allotment of water for a given time period.

In step 71, a user inputs a total monthly allotment for the irrigation area covered by the system. In step 72, either the system uses a default number or the user enters number for one or more of the stations controlled by the system, which number informs the system of the relative amount of water to be given to the various stations. In step 73, the controller determines the flow characteristics of each station, such as by causing each valve to open for a period of time, and obtaining flow data from a flow meter. In step 74, the controller uses the data obtained in steps 71–73, possibly along with other relevant data from local or distal data sources, to determine appropriate start times, designated watering amounts and so forth for each of the stations. One such input parameter, of course, may result from a more/less adjustment, which in this case would modify the relative amount of water delivered to the various stations, as opposed to the absolute amount. In step 75, water is applied to each of the stations (preferably in sequence) until data received from a flow or other appropriate metering device indicates that the designated water amount for that station has been applied.

In still other embodiments it is contemplated to include one or more overrides in the controller. For example, there may be a master override which prevents all watering in one or more zones. Such an override may be useful during system maintenance or malfunction. Another override may be available for selecting a subset of days which are appropriate for watering, or to preclude watering on certain days.

Such an override may be useful for preventing watering on days that grass is to be cut, or on days that games are to be played on a lawn.

Thus, specific embodiments and applications of methods of controlling irrigation have been disclosed. It should be apparent, however, to those skilled in the art that many more modifications besides those already described are possible without departing from the inventive concepts herein. For example, the more/less adjustment might affect all controlled valves at once, or might be limited to a subset of the controlled valves with additional more/less adjustments being provided for each subset. Similarly, it is possible to utilize various types of more/less controls such as buttons, sliders, rotating knobs, touch screens, and similar devices, which affects more or less water, and/or some other watering parameter such as frequency or duration. The inventive subject matter, therefore, is not to be restricted except in the spirit of the appended claims.

What is claimed is:

1. A method of controlling irrigation to a first irrigated zone, comprising:

providing an irrigation controller having a default irrigation schedule having a plurality of watering durations;

receiving a signal from a signal source, said signal being at least partially dependent upon a weather condition;

allowing the controller to control a watering valve for a substantial period of time according to the default irrigation schedule;

visually examining the first irrigated zone to determine the effect of watering according to the default irrigation schedule;

modifying the default irrigation schedule at least in part based upon the signal, and an algorithm executed by the controller without a user expressly instructing the controller when and how to change the watering duration;

providing the irrigation controller with a more/less adjustment mechanism that indirectly modifies an amount of water provided to the first irrigated zone relative to other zones irrigated by the controller;

the user operating the more/less adjustment mechanism to modify the default irrigation schedule to provide a modified schedule; and allowing the controller to control the valve according to the modified schedule.

2. The method of claim 1 further comprising the controller controlling at least two irrigation zones, and wherein the step of operating the more/less adjustment mechanism to modify the default irrigation schedule comprises operating the more/less adjustment mechanism to separately modify the irrigation schedule in each of the at least two irrigation zones.

3. The method of claim 1 wherein the step of providing a more/less adjustment mechanism comprises providing a first button corresponding to increasing the amount of water provided to the irrigated area, and a second button corresponding to decreasing the amount of water provided to the irrigated area.

4. The method of claim 1 wherein the step of providing a more/less adjustment mechanism comprises providing a slide control.

5. The method of claim 1 wherein the step of providing a more/less adjustment mechanism comprises providing a rotating control knob.

6. The method of claim 1 further comprising a plurality of watering zones controlled by the controller, wherein the more/less adjustment mechanism is used to modify a relative amount of water dispensed to the watering zones without modifying the total amount of water dispensed to the watering zones.

7. An irrigation controller, comprising:

a parameter receiving mechanism that automatically receives at least one environmental parameter selected from the group consisting of air temperature, wind, solar radiation, and humidity;

a microprocessor that controls a first irrigation schedule having a plurality of irrigation durations defining a first set of watering intervals executed independently from the environmental parameter;

wherein the first irrigation schedule is a default irrigation schedule; and wherein the parameter modifies the first irrigation schedule to a second irrigation schedule having another plurality of irrigation durations defining a second set of watering intervals executed independently from the environmental parameter.

8. The irrigation controller of claim 1 wherein the parameter receiving mechanism comprises a keypad.

9. The irrigation controller of claim 1 wherein the parameter receiving mechanism comprises a radio receiver.

10. The irrigation controller of claim 1 wherein the parameter receiving mechanism further receives water allotment information.

11. The irrigation controller of claim 1 wherein the parameter receiving mechanism further receives geographical location information.

12. The irrigation controller of claim 11 wherein the parameter receiving mechanism further receives a predefined irrigation schedule.

13. The irrigation controller of claim 11 wherein the parameter receiving mechanism further receives at least two irrigation parameters selected from the group consisting of plant type, soil type, slope, drainage, and a predefined irrigation schedule.

14. The irrigation controller of claim 1 wherein the parameter receiving mechanism further receives evapotranspiration rate information, and at least one additional irrigation parameter selected from the group consisting of plant type, soil type, slope, drainage, and a predefined irrigation schedule.

15. The irrigation controller of claim 1 wherein the parameter receiving mechanism comprises at least one of a keypad and a radio receiver.

16. The irrigation controller of any of claims 1 further comprising an adjustment receiving mechanism which receives a piece of adjustment information reflecting a determination of adequacy of the first irrigation schedule, and the microprocessor utilizes the adjustment information to determine the second irrigation schedule.

17. The irrigation controller of claim 16 wherein the adjustment receiving mechanism comprises a more/less adjustment that permits a user to modify the watering to a given zone relative to other zones without expressly altering a duration or a frequency in the irrigation schedule.

18. The irrigation controller of claim 16 further comprising a plurality of watering zones controlled by the controller, wherein the adjustment information is used to modify a relative amount of water dispensed to the watering zones without modifying the total amount of water dispensed to the watering zones.

* * * * *